US011683160B2

(12) United States Patent
Albrecht et al.

(10) Patent No.: US 11,683,160 B2
(45) Date of Patent: *Jun. 20, 2023

(54) ENCRYPTED GROUP COMMUNICATIONS

(71) Applicant: Orion Labs, San Francisco, CA (US)

(72) Inventors: Greg Albrecht, San Francisco, CA (US); Andy Isaacson, San Francisco, CA (US); Nelson Carpentier, San Francisco, CA (US); Dan Phung, San Francisco, CA (US); Schuyler Erle, San Francisco, CA (US)

(73) Assignee: Orion Labs, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/394,162

(22) Filed: Apr. 25, 2019

(65) Prior Publication Data

US 2020/0119914 A1 Apr. 16, 2020

Related U.S. Application Data

(63) Continuation of application No. 15/283,752, filed on Oct. 3, 2016, now Pat. No. 10,305,686.

(Continued)

(51) Int. Cl.
*H04L 9/00* (2022.01)
*H04L 9/08* (2006.01)
*H04L 9/40* (2022.01)

(52) U.S. Cl.
CPC .......... *H04L 9/0833* (2013.01); *H04L 63/065* (2013.01); *H04L 63/0435* (2013.01); *H04L 2209/80* (2013.01); *H04L 2463/062* (2013.01)

(58) Field of Classification Search
CPC ..... H04L 9/0833; H04L 63/065; H04L 12/02; H04L 9/0847; H04L 63/0435; H04L 2209/80; H04L 2209/24; H04L 9/08; H04L 9/0819; H04L 63/062; H04L 9/0816; H04L 9/083; H04L 63/064
See application file for complete search history.

(56) References Cited

U.S. PATENT DOCUMENTS

| 7,234,063 B1* | 6/2007 | Baugher | ............... H04L 9/0891 |
| | | | 713/153 |
| 2012/0204023 A1* | 8/2012 | Kuipers | .................. G06F 21/10 |
| | | | 713/150 |

(Continued)

*Primary Examiner* — Jeffrey C Pwu
*Assistant Examiner* — Helai Salehi

(57) ABSTRACT

Secure data transfers between communication nodes is performed using a group encryption key supplied by a remote management system. A first node transmits a request for secure communications with a second node to the remote management system using a control channel. The remote management system generates and encrypts a group encryption key usable by the first and second nodes and forwards the encrypted group encryption key to the first and second nodes using one or more control channels. The first and second communication nodes decrypt the group encryption key and use it to encrypt data transmitted between the nodes using a data transport network. In some implementations the securely communicating nodes may use encryption keys and/or techniques that prevent the remote management system from eavesdropping on the nodes' communications.

19 Claims, 6 Drawing Sheets

Related U.S. Application Data

(60) Provisional application No. 62/236,534, filed on Oct. 2, 2015.

(56) References Cited

U.S. PATENT DOCUMENTS

| | | | |
|---|---|---|---|
| 2014/0380049 A1* | 12/2014 | Bernsen | H04L 9/0816 713/168 |
| 2016/0065374 A1* | 3/2016 | Sauerwald | H04L 9/0866 726/19 |
| 2016/0197901 A1* | 7/2016 | Lester | H04L 63/065 380/283 |
| 2017/0126404 A1* | 5/2017 | Unagami | G06F 21/44 |

* cited by examiner

ENCRYPTED GROUP COMMUNICATIONS

RELATED APPLICATIONS

This application is a Continuation of, and claims priority to U.S. patent application Ser. No. 15/283,752, filed Oct. 3, 2016, entitled "ENCRYPTED GROUP COMMUNICATIONS," and also claims the benefit of, and priority to U.S. Provisional Patent Application 62/236,534, entitled "ENCRYPTED GROUP COMMUNICATION DEVICES WITH SIDE CHANNEL KEYS," filed Oct. 2, 2015, each of which is hereby incorporated by reference in their entirety (including any appendices thereto).

TECHNICAL FIELD

Aspects of the disclosure are related to the field of communications and, in particular, to secure communications for group communications.

TECHNICAL BACKGROUND

Various communication devices can be employed to facilitate communication between users. These devices can include cellular telephones, smartphones, discrete devices, computers, and tablets, among others, which provide an efficient way for users to communicate without being in the same physical location. These devices may be grouped together to facilitate communications among some but not all of the devices on a network. When devices within a group wish to transmit sensitive information over public links to one another, they need to be able to encrypt the information quickly, easily and securely so that the information can be read (or otherwise used) only by authorized recipients.

OVERVIEW

Secure data transfers between communication nodes (e.g., members of a communication node group) can be performed using a group encryption key supplied by a remote management system or the like. A first communication node transmits a request to the remote management system using a control channel or other management link, asking for secure communications with one or more additional communication nodes (e.g., a second communication node). The request can include identity data that allows the remote management system to generate a group encryption key usable by the first communication node and any additional communication nodes to which the request applies. The remote management system may encrypt the group encryption key and forward the encrypted group encryption key using one or more control channels to the first communication node and second communication node. The first and second communication nodes decrypt the group encryption key and use it to encrypt data transmitted between the nodes using a data transport network (e.g., including a transport server and one or more data transport links). In some implementations the securely communicating nodes may use encryption keys and/or techniques that prevent the remote management system from eavesdropping on the nodes' communications.

DETAILED DESCRIPTION

The non-limiting examples below discuss personal communication nodes that allow group communication sessions among various authorized users (e.g., members of the group). These personal communication nodes can include discrete devices (e.g., wearable communication devices) specialized for group communications that include one or more wireless transceivers and user interface elements tailored to streamline group communications. The group communications can be initiated and altered (e.g., by user intervention and/or automatically by a shared remote management system which can respond to one or more dynamic factors to form or change groups or group status). In some examples, one or more features of the discrete devices can be incorporated into other devices, such as personal communication devices which comprise cellular smartphones, gaming devices, personal computers, tablet computers, and the like. Voice command features can be included that comprise group forming and alteration features, keyword-based searching, productivity assistance, or navigation assistance, among other features. Further features can include conversational interaction for information transmittal or retrieval, such as activity reminders, weather, stocks, messaging, email, calendar, contacts, notes, music, clocks, web browsers, maps and other applications.

When these various devices stream or otherwise transfer data between each other, sensitive data needs to be encrypted to prevent unauthorized access. When two different nodes wish to transfer sensitive data they may contact a remote management system that generates encryption keys for the nodes and provides the keys to the nodes using channels separate from the transport channels used to transfer the data.

Figure 1:
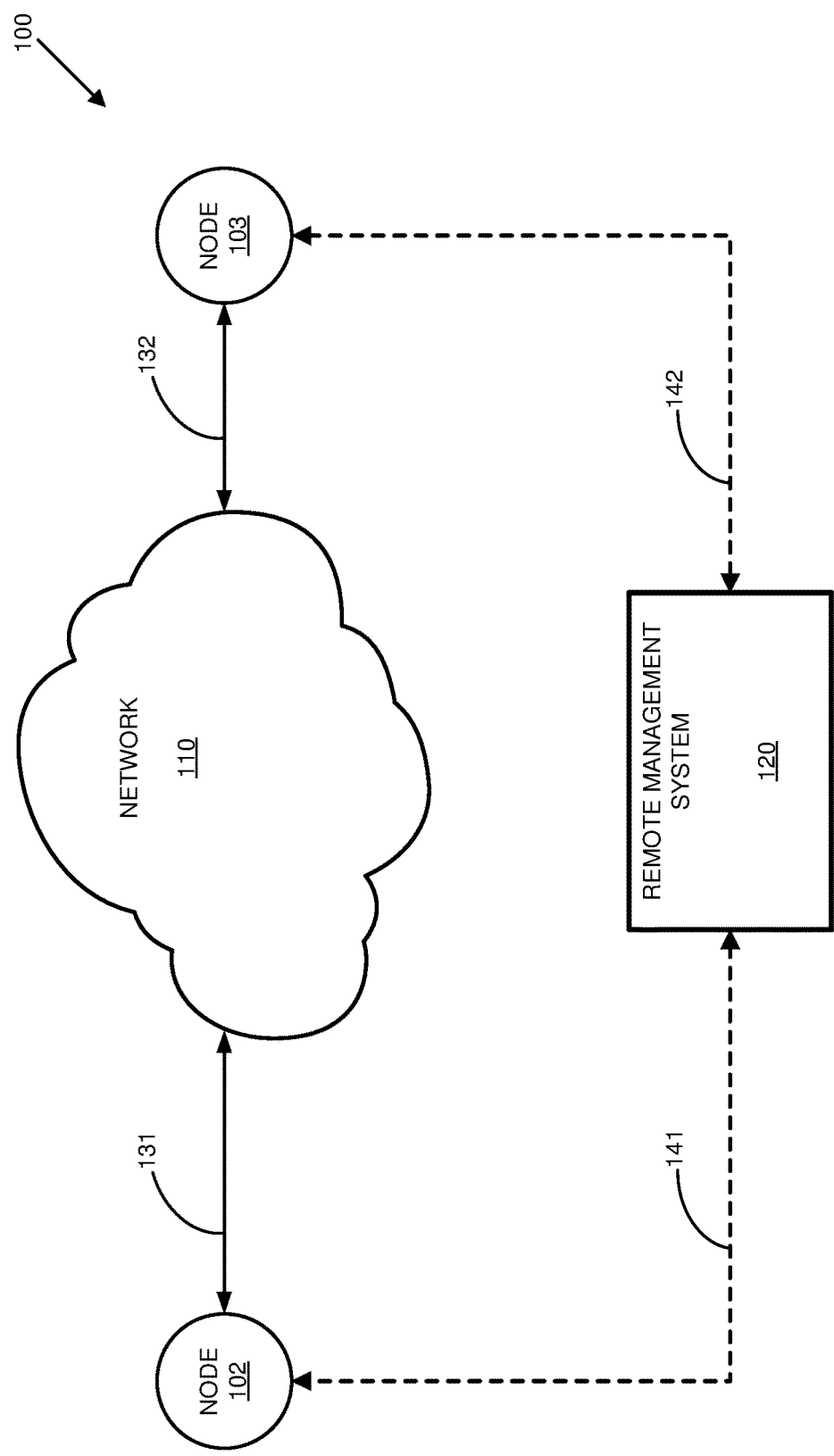
FIG. 1 illustrates a communication system.

In a first non-limiting example, FIG. 1 illustrates communication system 100, which can be employed to provide encryption features for data transfers between communication nodes 102 and 103. System 100 includes communication nodes 102 and 103, and remote management system 120.

Communication nodes 102 and 103 may each comprise one or more transceivers, audio transducers, processing systems, communication interfaces, environmental sensors, accelerometers, gyroscopes, Global Positioning System (GPS) receivers, user interfaces, and other systems. Remote management system 120 may comprise a computing system comprising one or more computing devices capable of managing services to a plurality of communication nodes, such as communication nodes 102 and 103.

Communication nodes 102 and 103 communicate with remote management system 120 over associated ones of management links 141 and 142, which can comprise one or more network links and which can function as control channels (and are referred to as such) in this and other examples. Management links 141 and 142 can each comprise one or more wireless links that can each further include Long Term Evolution (LTE), Global System For Mobile Communications (GSM), Code Division Multiple Access (CDMA), IEEE 802.11 WiFi, Bluetooth, Personal Area Networks (PANs), Wide Area Networks, (WANs), Local Area Networks (LANs), or Wireless Local Area Networks (WLANs), including combinations, variations, and improvements thereof. These links can carry any communication protocol suitable for wireless communications, such as Internet Protocol (IP) or Ethernet.

Additionally, management links 141 and 142 can include one or more wired portions which can comprise synchronous optical networking (SONET), hybrid fiber-coax (HFC), Time Division Multiplex (TDM), asynchronous transfer mode (ATM), circuit-switched, communication signaling, or some other communication signaling, including combinations, variations or improvements thereof. Management links 141 and 142 can each use metal, glass, optical, air, space, or some other material as the transport media. Management links 141 and 142 may each be a direct link, or may include intermediate networks, systems, or devices, and may include a logical network link transported over multiple physical links.

In the non-limiting example of FIG. 1, each communication node 102 and 103 monitors one or more attributes (e.g., from associated positional sensors, audio transducers, GPS receivers, accelerometers, wireless transceivers, environmental sensors, or other sensors or devices capable of monitoring the attributes discussed herein). These attributes comprise data or information that may be used for dynamically forming and changing node groups, as well as for intelligent agent features for communication nodes 102 and 103. For example, one or more of the sound level of an environment, user preferences, proximity of one personal communication node to another, location, communication status, identity, and traveling speed may be attributes used for dynamically forming and changing groups of nodes as well as for intelligent agent features for nodes 102 and 103.

Communication nodes 102 and 103 periodically transfer messages for delivery to remote management system 120 (e.g., indicating dynamic changes in one or more attributes, user inputs, and/or other data useful in managing a node or a node group). Communication nodes 102 and 103 may transfer a message to remote management system 120 whenever an attribute changes and/or at periodic intervals. Remote management system 120 can use dynamic changes in one or more attributes to form, modify and/or terminate groups of communication nodes 102 and 103, and for intelligent agent features for communication nodes 102 and 103. Although remote management system 120 and nodes 102 and 103 are each shown as separate entities in FIG. 1, it should be understood that features of remote management system 120 can be included in one or more of personal communication nodes 102 and 103.

A communication node may use one or more secure communication methods for communicating with members of a communication group, with non-members and/or with a remote management system or the like. Secure communication methods include systems, techniques, protocols, methods and other approaches enabling users and nodes to securely share communications and other information with one another without interception or monitoring of the information or associated communications by non-members and/or an unauthorized third-party. Secure communication methods may comprise symmetric key encryption, asymmetric key encryption, public-key encryption, or some other type of encryption, including combinations thereof. The actual communications between personal communication nodes can employ secure communication methods, and the associated links can employ secure communication methods independently.

End to end encryption of communications, such as audio communications, can be established among members of the group. These end-to-end encrypted communications can include transport layer security (TLS) or secure sockets layer (SSL) communications, among other secure link types. For example, a secure communication session can be established between nodes 102 and 103.

In such an example, when node 102 wishes to securely communicate with node 103 through transport channels 131 and 132 and through network 110, node 102 sends a request for encryption keys through control channel 141 to remote management system 120. Remote management system 120 then generates keys for nodes 102 and 103 to use in securely communicating through network 110 and transport channels 131 and 132.

Communication nodes 102 and 103 communicate with each other or with other communication nodes or intelligent agents over associated links 131 and 132 (and, in this non-limiting example, over network 110). Communication links 131 and 132 can be used to connect communication nodes 102 and 103 to each other and/or to other personal communication nodes. In some examples, links 131 and 132 may comprise a mesh network among communication nodes 102 and 103, and other nodes. Furthermore, links 131 and 132 can comprise Bluetooth, IEEE 802.11 WiFi, infrared, ultrasonic, or any wireless communication format including combinations, variations or improvements thereof. Communication links 131 and 132 can each use air or space as the transport media.

Figure 2:
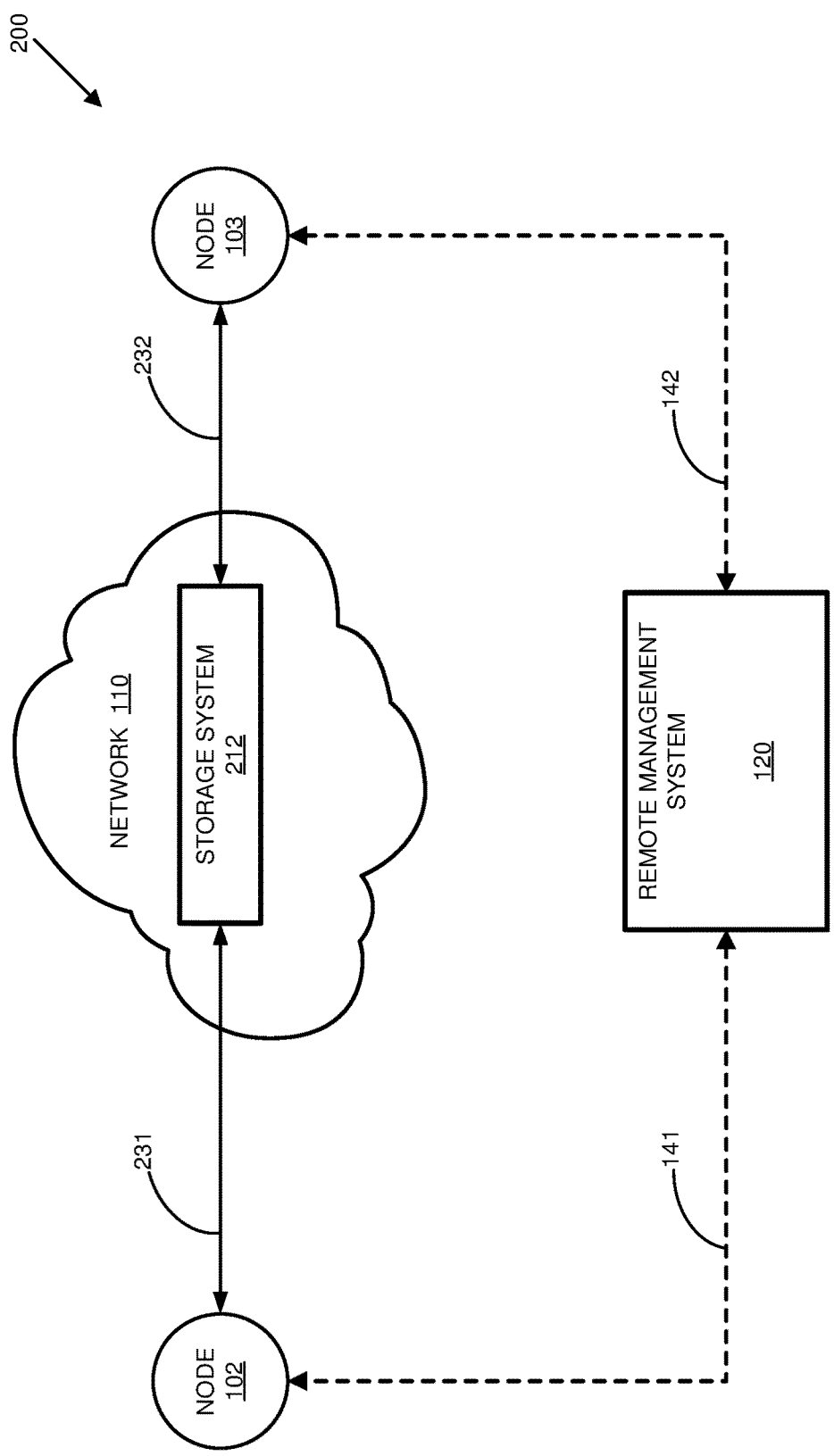
FIG. 2 illustrates a communication system.

FIG. 2 illustrates a non-limiting example of communication system 200, which shares some similarities with communication system 100 shown in FIG. 1. In this example, node 102 sends data securely to node 103 (and possibly other nodes), which includes intermediately storing the data in storage system 212 within network 210 (e.g., a cloud storage device).

In this non-limiting example, node 102 sends a request for one or more encryption keys to remote management system 120 over control channel 141 (communications over control channel 141 may be made secure in an appropriate manner). In response, remote management system 120 sends the requested encryption key(s) to node 102 over control channel 141 and one or more corresponding decryption keys to node 103 over control channel 142 (again, as with control channel 141, communications over control channel 142 may be made secure). Node 102 encrypts the data using an encryption key obtained from remote management system 120 and transfers the encrypted data to storage system 212 over transport channel 231 (e.g., using one or more transport servers that temporarily hold data in transit between nodes, which act as endpoints in system 200). Node 103 then transfers the encrypted data from storage system 212 over transport channel 232 and decrypts the data using the appropriate decryption key obtained from remote management system 120.

Figure 3:
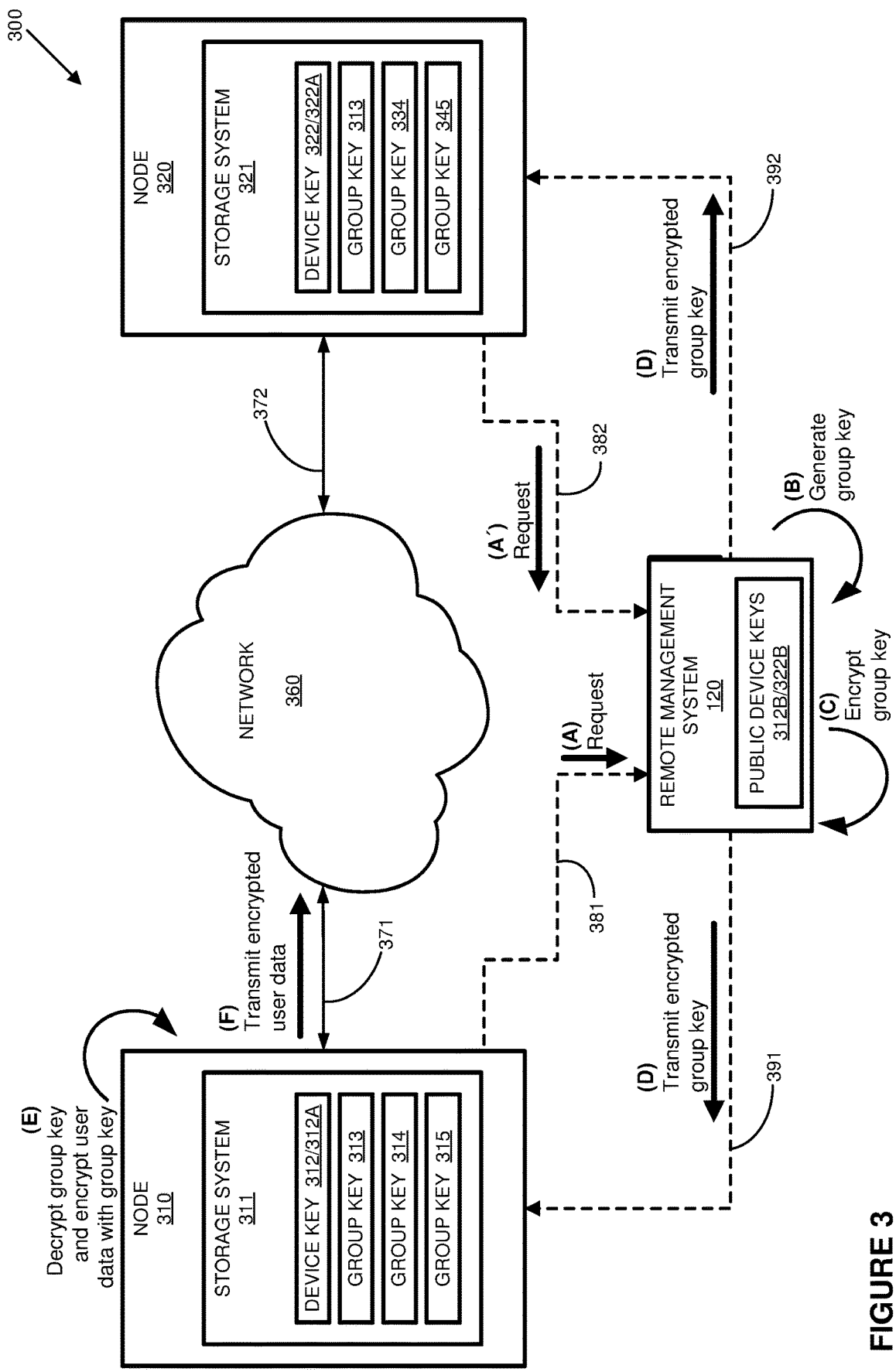
FIG. 3 illustrates a communication system.

FIG. 3 illustrates communication system 300, which shares some similarities with communication system 200 in FIG. 2, and which further illustrates details in communication nodes 310 and 320. In this non-limiting example, node 310 is a member of various node groups, as is node 320, though nodes 310 and 320 may not be members of the same group in some instances. Node 310 includes storage system 311 which stores device key 312, group key 313, group key 314, and group key 315. Node 320 includes storage system 321 which stores device key 322, group key 313, group key 334, and group key 345. In some implementations group keys can be used in symmetric encryption and decryption of communications between nodes.

In the non-limiting example of FIG. 3, device keys 312 and 322 may be programmed or otherwise incorporated into nodes 310 and 320 at manufacture. Remote management system 350 can also maintain copies of all of the device keys for the various nodes associated with and/or serviced by system 350 in some implementations. In this case, node 310 and node 320 wish to communicate securely. Node 310 sends a request to remote management system 350 over control channel 381 (step (A)) for a group key to use in communicating with node 320 along with identity data for node 310 (e.g., device key 312). Alternatively, node 320 may send the request for a group key to remote management system 350 over control channel 382 (step (A")).

In some implementations remote management system 350 can determine the device key 312 for node 310 (e.g., if it is not previously programmed into node 310 and/or transmitted to remote management system 350 by node 310) based on the identity data transferred from node 310. Remote management system 350 generates group key 313 (step (B)) for nodes 310 and 320 to use to communicate securely with one another. Remote management system 350 encrypts group key 313 (step (C)) (e.g., with device key 312 or another key corresponding to the device identity of node 310) and transfers the encrypted key (step (D)) to node 310 over control channel 391. System 350 can also then encrypts group key 313 (e.g., with device key 322 or another key corresponding to the device identity of node 320) and transfer the encrypted group key 313 to node 320 (step (D)) over control channel 392. The transferred group key is decrypted by node 310 and then used to encrypt user data (step (E)). The encrypted user data can then be transmitted from node 310 to node 320 using data transport links 371, 372 and data transport network 360 (step (F)). The data may be sent in a stream including a header, encrypted block(s), and an end of stream marker. The transport network can manage various streams using stream identifiers that ensure streams are delivered only to appropriate receiving nodes.

Instead of receiving device key 312 or determining device key 312 from the identity of node 310, remote management system 350 may negotiate an ephemeral device key 312 with node 310 over control channels 381 and 391 (e.g., using a cryptographic key exchange algorithm, such as Diffie-Hellman, ElGamal, or other secure key exchange algorithm). By this method device key 312 can be used by both remote management system 350 and node 310, but is never transmitted over a network, nor stored on a storage device.

Moreover, in this way, no unencrypted keys are transferred over any channel (including control channels). Once nodes 310 and 320 have group key 313, they may use group key 313 to encode and decode communications between them over transport channels 371 and 372 through network 360 (e.g., using a transport server).

Where a remote management system 350 provides instructions to multiple communications nodes regarding the formation, modification, and removal of groups, the users of those nodes may wish to keep their communications private from a third-party operator of the remote management system 350. In such implementations communication nodes, such as communication nodes 310 and 320, may exchange secure communications to the exclusion of potential eavesdropping by a remote management system 350.

In these types of situations, the device keys 312, 322, etc. of corresponding nodes 310, 320, etc. may be cryptographically-secure asymmetric key pairs (e.g., each of which comprises a private device key 312A and a public device key 312B and so on). The computation of the asymmetric key pairs may be accomplished with PKCS #1, Elliptic Curve cryptography, or other asymmetric cryptographic techniques, algorithms, etc. These device keys can be provisioned on the communications nodes before the initiation of inter-nodal communications, such that the private device key 312A is known only to node 310, and is not known to the remote management system 350, nor to any of the other communications nodes. By contrast, public device keys 312B, 322B, and so on, are meant to be known to all parties (e.g., shared with the remote management system 350 and with all communication nodes via control channels 381, 391, 382, 392, etc.).

Communications from node 310 to node 320 may be kept private from remote management service 350 by generating group key 313 on node 310, and then encrypting group key 313 for the use of node 320 using its public device key 322B. Node 310 then transmits the encrypted group key 313A to node 320 via the remote management system 350 over control channels 381 and 392.

Note that remote management system 350 cannot discover the group key 313 from the encrypted group key 313 as it does not possess the private key 322A. As a consequence, even if the operator of the remote management system 350 can observe transport channels 371 or 372, or any part of the network 360, it cannot decrypt any communications sent by node 310 to node 320, or vice versa, because it lacks and cannot obtain group key 313.

This method may be extended to groups of communications nodes of any size, through multiple pairwise asymmetric encryption of group keys 313, 314, etc. using public device keys 312B, 322B, and so on.

A further refinement of this example allows node 310 to authenticate the public device key 322B belonging to node 320. A group of communications nodes may have access to a public certification key 351B, which may be provisioned on each node at the time of manufacture or before the start of inter-nodal communications. Prior to the delivery of the public device key 322B to node 310, public device key 322B may be cryptographically signed by a certifying authority in possession of the private certification key 351A which is the private key in the key pair including public certification key 351B. The cryptographic signature may be generated using Digital Signature Algorithm (DSA), Elliptic Curve DSA, or any other asymmetric cryptographic signature algorithm. In this manner, node 310 may use the cryptographic signature algorithm to authenticate the public key 322B, even if it was provided by an unknown and/or untrusted remote management system 350.

Figure 4:
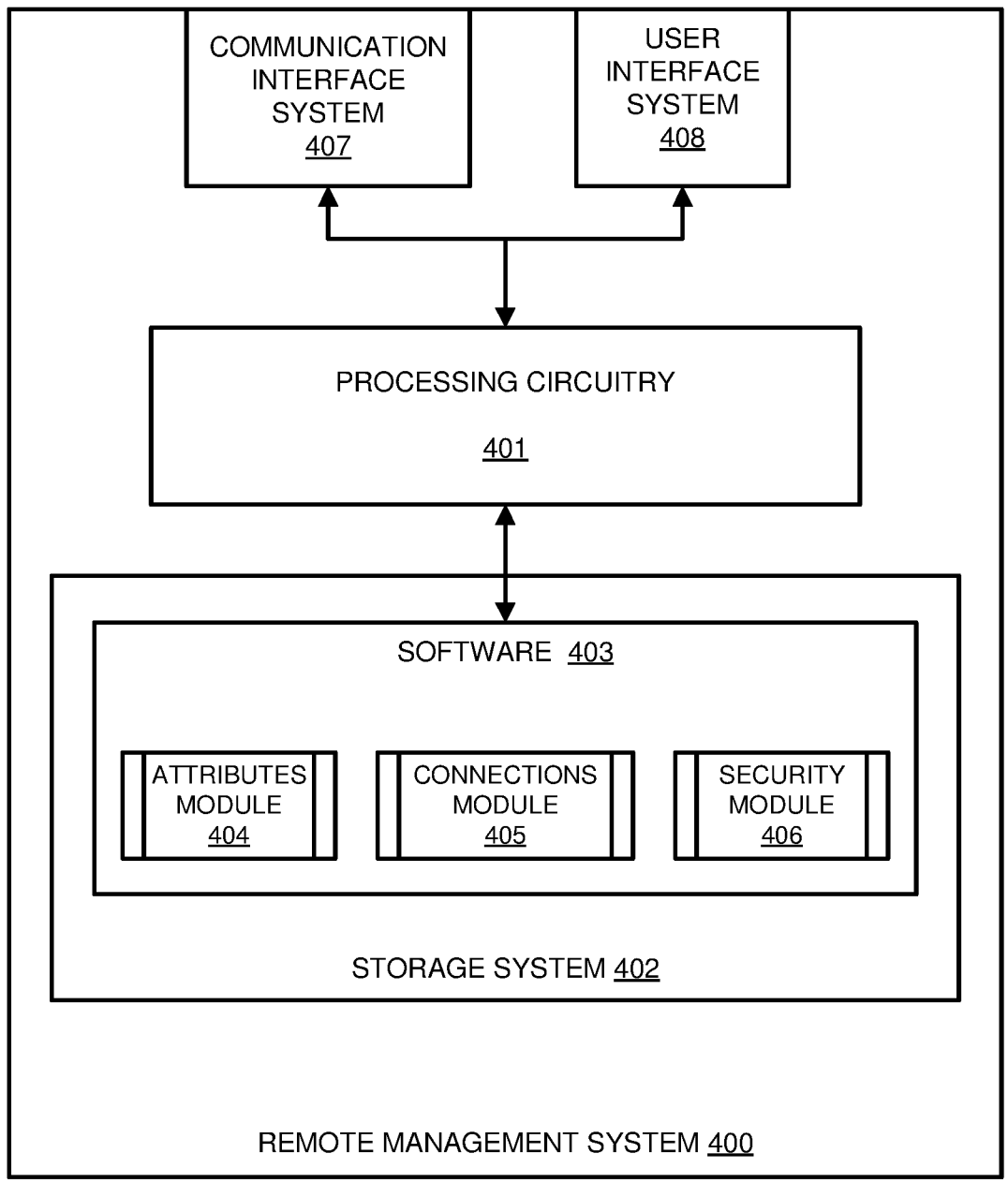
FIG. 4 illustrates a remote management system.

FIG. 4 illustrates one or more implementations of a remote management system 400. Computing system 400 is a non-limiting example (e.g., of a computing environment that can execute features of remote management system 120 of FIG. 1 and/or remote management system 350 of FIG. 3). Furthermore, elements of remote management system 400 can be distributed over one or more computing devices (including one or more communication nodes). Remote management system 400 includes processing circuitry 401, storage system 402, software 403, communication interface system 407, and user interface system 408.

It may be understood that remote management system 400 is generally intended to represent one or more computing systems on which software 403 may be deployed and executed (e.g., in order to implement remote management system(s) 120 and/or 350). However, remote management system 400 may also be suitable as any computing system on which software 403 may be staged and from where one or both may be distributed, transported, downloaded, or otherwise provided to yet another computing system for deployment and execution, or yet additional distribution.

Communication interface system 407 may include communication connections and devices that allow for communication with other computing systems over a communication network. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

User interface system 408 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 408. In some cases, the input and output devices may be combined in a single device, such as a display capable of displaying images and receiving touch gestures.

User interface system 408 may also include associated user interface software executable by processing circuitry 401 in support of the various user input and output devices discussed above. Separately or in conjunction with each other and other hardware and software elements, the user interface software and user interface devices may support a graphical user interface, a natural user interface, or any other type of user interface. In addition, user input made with respect to the user interfaces may be input via user interface system 408.

Communication between remote management system 400 and any other computing system may occur over a communication network or networks and in accordance with various communication protocols, combinations of protocols, or variations thereof. Examples of such communication networks include intranets, internets, the Internet, local area networks, wide area networks, wireless networks, wired networks, virtual networks, software defined networks, data center buses, computing backplanes, or any other type of network, combination of network, or variation thereof. Some communication protocols that may be used include, but are not limited to, the Internet protocol (IP, IPv4, IPv6), the transmission control protocol (TCP), and the user datagram protocol (UDP), as well as any other suitable communication protocol, variation, or combination thereof.

Processing circuitry 401 can comprise one or more microprocessors and other processing circuitry that retrieves and executes software 403 from storage system 402. Processing circuitry 401 can be implemented within a single processing device but can also be distributed across multiple processing devices or sub-systems that cooperate in executing program instructions. Examples of processing circuitry 401 include general purpose central processing units, application specific processors, and logic devices, as well as any other type of processing device, combinations, or variations thereof. In some examples, portions of processing circuitry 401 is separate physically from some elements of remote management system 400 and area included in remote servers, cloud-based processing systems, or virtualized computing systems.

Storage system 402 can comprise any non-transitory computer readable storage media capable of storing software 403 that is executable by processing circuitry 401. Storage system 402 can also include various data structures which comprise one or more databases, tables, lists, or other data structures. Storage system 402 can include volatile and nonvolatile, removable and non-removable media implemented in any method or technology for storage of information, such as computer readable instructions, data structures, program modules, or other data. Storage system 402 can be implemented as a single storage device but can also be implemented across multiple storage devices or sub-systems co-located or distributed relative to each other. Storage system 402 can comprise additional elements, such as a controller, capable of communicating with processing circuitry 401. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 403 can be implemented in program instructions and among other functions can, when executed by remote management system 400 in general or processing circuitry 401 in particular, direct remote management system 400, or processing circuitry 401 to operate as described herein for a remote management system or other functional systems. Software 403 can include additional processes, programs, or components, such as operating system software, database software, or application software. Software 403 can also comprise firmware or some other form of machine-readable processing instructions executable by elements of processing circuitry 401.

In at least one implementation, the program instructions can include attributes module 404, connection module 405, and encryption module 406. Attributes module 404 can monitor one or more attributes of personal communication nodes (e.g., transferring messages for delivery to a management system indicating dynamic changes in one or more attributes). These attributes and dynamic changes in attributes can be used to form and change dynamic communication groups among personal communication nodes and intelligent agent nodes. Attributes module 404 may periodically or continuously monitor attributes associated with personal communication node sensors or personal communication nodes may send messaging or alerts to attributes module 404 when changes are detected. Attributes module 404 receives attributes (e.g., from communication nodes 102 and 103), and transmits attributes (e.g., to communication nodes 102 and 103 over control channels such as communication links 141 and 142 in FIG. 1).

Connection module 405 can monitor numerous attributes of the various communication nodes 102 and 103, and based on those attributes automatically forms and modifies groups. Connection module 405 (or elsewhere in storage system 402) may contain a list of pre-configured group parameters that may be used to automatically form pre-configured groups when tokens are received from two or more communication nodes. Connection module 405 also provides group formation and modification functionality to a master node enabling it to create and modify groups of slave nodes. Connection module 405 also may open, control, modify, close, etc. control channels between an remote management system and one or more communication nodes, for example working via communication interface system 407.

Encryption module 406 receives data (e.g., requests for keys from communication nodes such as nodes 102 and 103 of FIG. 1 and/or nodes 310 and 320 of FIG. 3) and generates encryption keys (e.g., for transfer to the nodes over control channels). In some non-limiting examples, encryption module 406 (or elsewhere in storage system 402) contains device keys for the various communication nodes that may be indexed by communication node identity. This key data must be kept physically and electronically secure from outside access since it can be used to encrypt keys that are then transferred over control channels to various communication nodes. Encryption module 406 may also use secure cryptographic key exchange algorithms (e.g., to negotiate ephemeral encryption keys with nodes 102 and 103 and/or nodes 310 and 320, which are never stored in the storage system 402).

In general, software 403 can, when loaded into processing circuitry 401 and executed, transform processing circuitry 401 overall from a general-purpose computing system into a special-purpose computing system customized to operate as described herein for a remote management system, among other operations. Encoding software 403 on storage system 402 can transform the physical structure of storage system 402. The specific transformation of the physical structure can depend on various factors in different implementations of this description. Examples of such factors can include, but are not limited to the technology used to implement the storage media of storage system 402 and whether the computer-storage media are characterized as primary or secondary storage. For example, if the computer-storage media are implemented as semiconductor-based memory, software 403 can transform the physical state of the semiconductor memory when the program is encoded therein. For example, software 403 can transform the state of transistors, capacitors, or other discrete circuit elements constituting the semiconductor memory. A similar transformation can occur with respect to magnetic or optical media. Other physical media transformations are possible without departing from the scope of the present description, with the foregoing examples provided only to facilitate this discussion.

Figure 5A:
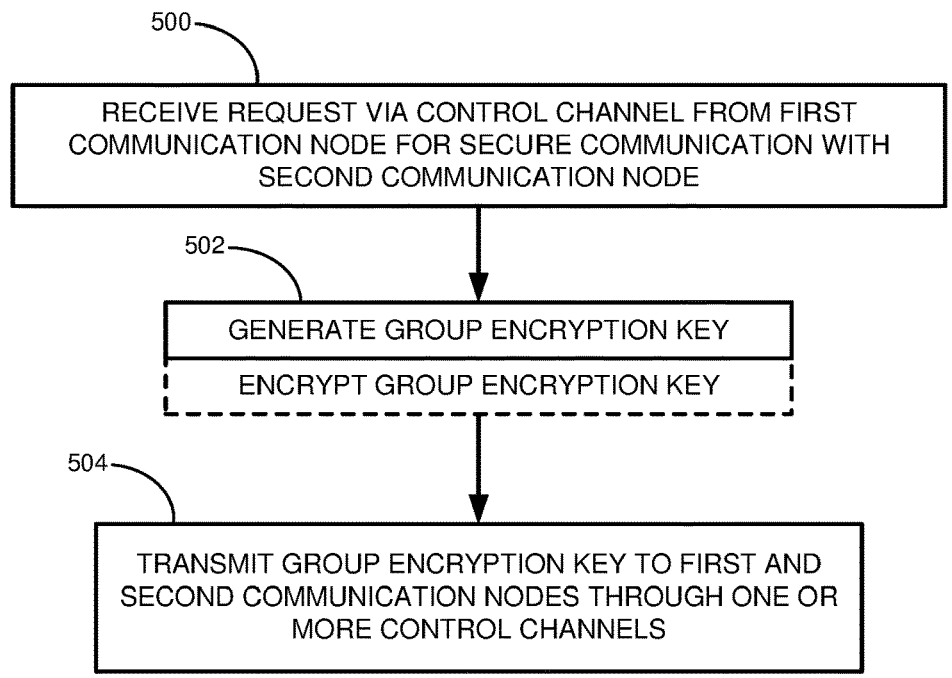
FIG. 5A illustrates a method for operating a remote management system.
Figure 5B:
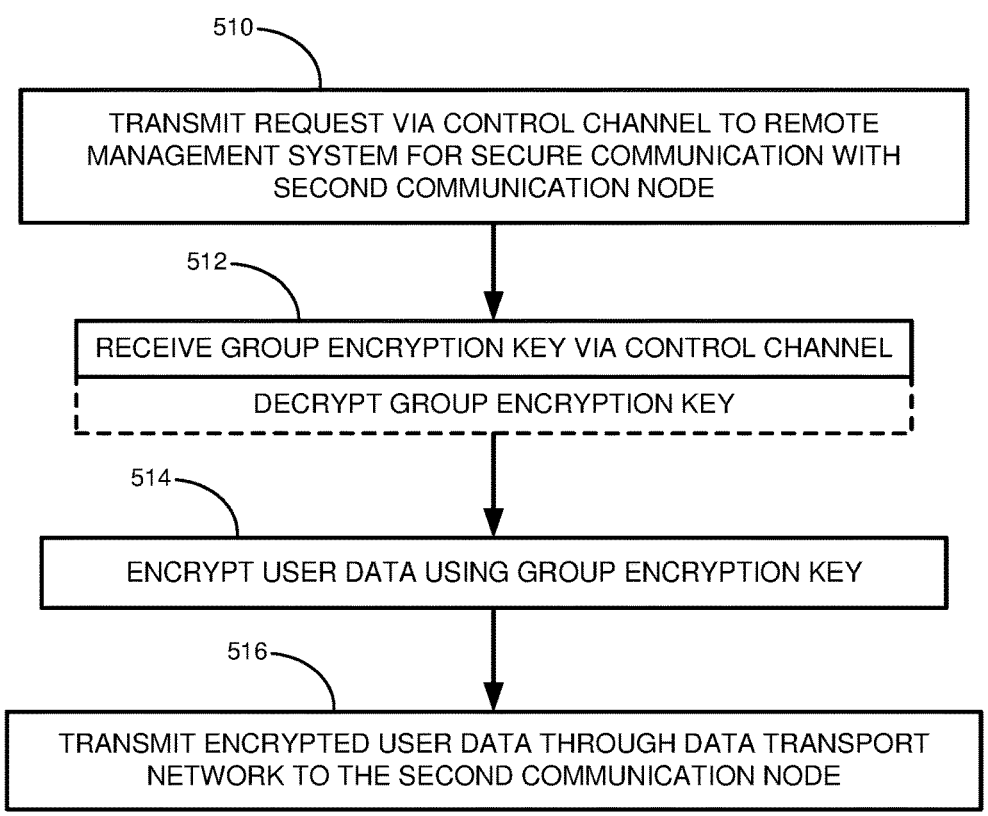
FIG. 5B illustrates a method for operating a remote management system.

FIG. 5A illustrates a method for operating a remote management system (e.g., remote management system(s) 120 and/or 350, as illustrated in the Figures). The remote management system may receive a request from a first communication node for secure communication with a second communication node (operation 500). The request may also identify a communication node group that remote management system manages. By identifying the communication group, the remote management system can then identify the group's constituent nodes and make sure that keys and/or other information is distributed to the communication nodes relating to the request. The remote management system generates a group encryption key for the first and second communication nodes (operation 502). FIG. 5B illustrates a method for operating a first communication node (e.g., nodes 102, 103, 310, 320 of the Figures) and enabling its secure communications with a second communication node or other entity. The first communication node transmits a request (operation 510) to a remote management system or the like, requesting secure communications with the second communication node (e.g., a node in a communication group managed by the remote management system). The request can be for secure communications with more than one other communication node in some implementations. The first communication node receives a group encryption key (operation 512) and, if the received key is encrypted, then decrypts the group encryption key. The first communication node encrypts data (e.g., user data, streaming data, voice communication data) using the group encryption key (operation 514). The encrypted data is then transmitted (operation 516) to the second communication node using a transport network (e.g., a transport server and associated transport link(s)).

The group encryption key is then transmitted to the first and second communication nodes (e.g., through control channels) (operation 504). The first and second communication nodes may then exchange secure communications.

Figure 6:
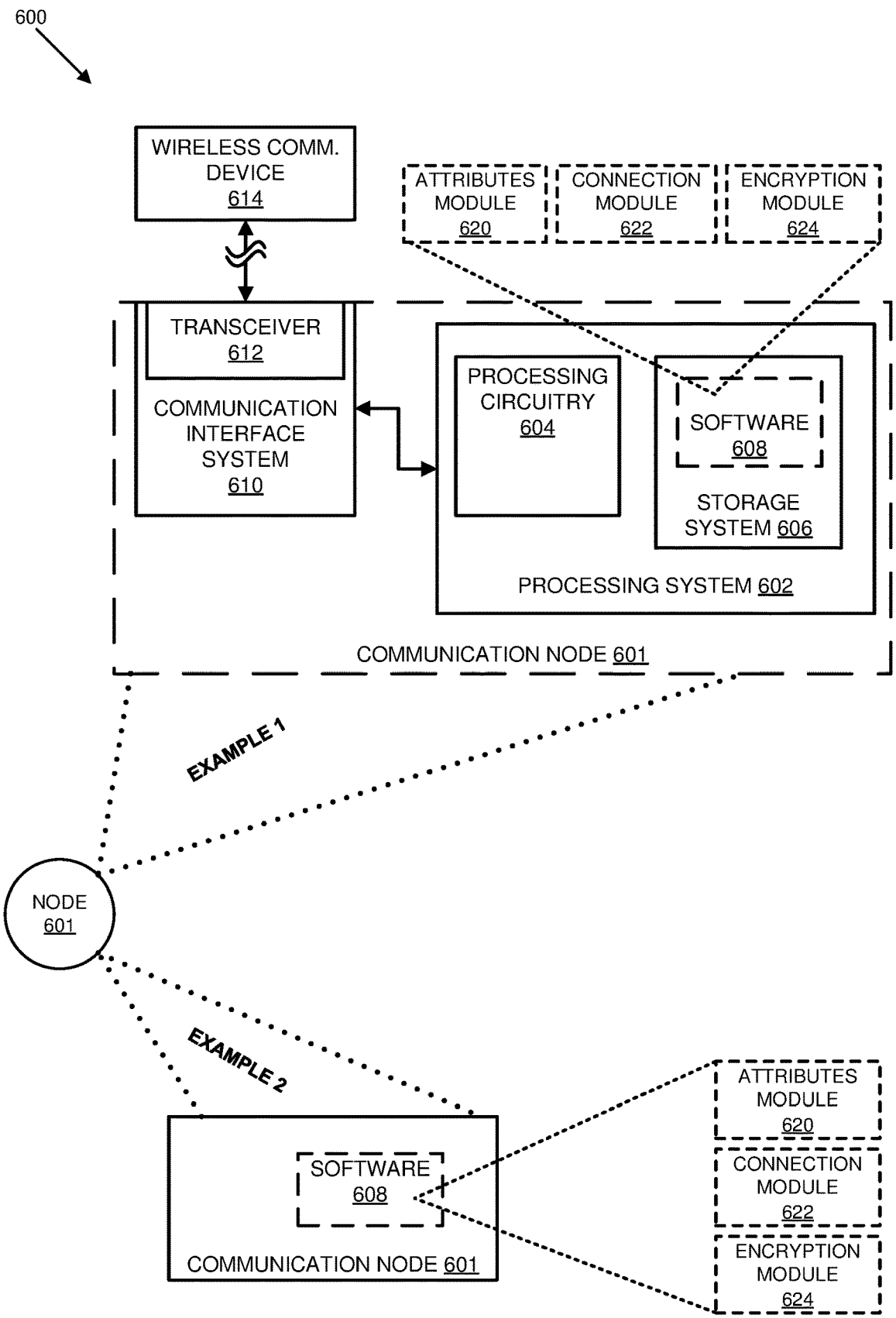
FIG. 6 illustrates a communication node.

FIG. 6 illustrates two or more exemplary systems 600 for personal communication nodes, such as personal communication node 601. Personal communication node 601 is an example of or can be part of personal communication nodes 102 and 103; however, personal communication node 601 may have alternative configurations and methods of operation. Example 1 comprises node 601 and wireless communication device 614. Wireless communication device 614 may comprise a smartphone, tablet device, computer, gaming device, laptop computer, or some other communication device capable of communicating using packet networks or some other communication network. Example 2 illustrates personal communication node software within an operating environment of an electronic device, wherein the electronic device may comprise a smartphone, tablet device, computer, gaming device, laptop computer, or some other communication device capable of communicating using packet networks or some other communication network, running a personal communication node software application that comprises personal communication node 601.

In the non-limiting example of Example 1, node 601 further comprises processing system 602 and communication interface system 610. Processing system 602 further comprises processing circuitry 604 and storage system 606. Processing circuitry 604 comprises microprocessors and other circuitry that retrieves and executes software 608 from storage system 606. Processing circuitry 604 may comprise a single device or could be distributed across multiple devices—including devices in different geographic areas. Processing circuitry 604 may be embedded in various types of equipment.

Storage system 606 comprises a non-transitory computer readable storage medium, such as a disk drive, flash drive, data storage circuitry, or some other hardware memory apparatus. Storage system 606 may comprise a single device or could be distributed across multiple devices—including devices in different geographic areas. Storage system 606 may be embedded in various types of equipment. In some examples, a computer apparatus could comprise processing circuitry 604, storage system 606 and software 608. Software 608 comprises attributes module 620 and connection module 622. In addition, software 608 may include operating systems, utilities, drivers, network interfaces, applications, or some other type of software.

Attributes module 620 monitors one or more attributes of personal communication node 601 (e.g., periodically transferring a message for delivery to a management system indicating dynamic changes in the one or more attributes). Personal communication node 601 may comprise attribute sensors such as transceivers, speakers, microphones, processing systems, communication interfaces, environmental sensors, accelerometers, gyroscopes, Global Positioning System (GPS) receivers, user interfaces and other systems to monitor various attributes and provide communications to a remote management system. Attributes module 620 may periodically or continuously monitor attribute sensors or attribute sensors may send an interrupt to attributes module 620 when a change is detected.

Connection module 622 can receive instructions from a remote management system regarding the formation, modification, and removal of groups (e.g., communicating with the remote management system via control channels and/or management communication links). It also can control the connection of node 601 with other communication nodes for various communication functions.

Encryption module 624 stores device and group encryption keys and uses these keys to encrypt and decrypt data transferred between node 601 and one or more additional communication nodes and/or external storage for later retrieval. A device key may be placed in encryption module 624 at the time of manufacture of communication node 601 (or one or more components of node 601).

Communication interface system 610 further comprises transceiver 612 for communicating with wireless communication device 614. Transceiver 612 comprises communication components, such as ports, signal processing circuitry, memory, software, and the like. Transceiver 612 communicates with wireless communication device 614 over a link that may comprise a Bluetooth communication link, WiFi link, infrared, ultrasonic or any other communication link between personal communication node 601 and wireless communication device 614.

In the non-limiting example of Example 2, node 601 may comprise a processing system further comprising processing circuitry and a storage system. Processing circuitry may comprise microprocessors and other circuitry that retrieves and executes software 608. Processing circuitry may comprise a single device or could be distributed across multiple devices—including devices in different geographic areas. Processing circuitry may be embedded in various types of equipment. Node 601 may also comprise a storage system further comprising a non-transitory computer readable storage medium, such as a disk drive, flash drive, data storage circuitry, or some other hardware memory apparatus. The storage system may comprise a single device or could be distributed across multiple devices—including devices in different geographic areas. The storage system may be embedded in various types of equipment.

Node 601 further comprises software 608 including attributes module 620, connection module 622 and encryption module 624. In addition, software 608 may include operating systems, utilities, drivers, network interfaces, applications, or some other type of software. Attributes module 620 can monitor one or more attributes of personal communication node 601 (e.g., periodically transferring a message for delivery to a management system indicating dynamic changes in one or more attributes).

Connection module 622 can control connection of node 601 with a remote management system (e.g., receiving instructions from a remote management system regarding the formation, modification, and removal of groups as well as transmitting and receiving encryption/decryption keys and other cryptographic data). Module 622 also can control the connection of node 601 with other communication nodes for various communication functions.

Encryption module 624 stores device and group encryption keys and uses these keys to encrypt and decrypt data for transfer to other communication nodes or to external storage for later retrieval by other communication nodes. A device key may be placed in encryption module 624 at the time of manufacture of communication node 602.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. A method comprising:
   managing a group of communication nodes, including establishing secure communication between communication nodes, via a remote management system, including:
   receiving, at the remote management system via a control channel including a first network link used by the remote management system to manage communication nodes, a request from a first communication node to enable secure communications between the first communication node and a second communication node across a transport channel, the transport channel including a second network link separate from the control channel;
   generating, at the remote management system in response to the received request, a group encryption key to enable secure communication between the first communication node and the second communication node via the transport channel;
   encrypting the group encryption key prior to transferring the group encryption key to the first and second communication nodes through one or more control channels; and
   transferring the group encryption key from the remote management system to the first and second communication nodes through the control channel.

2. The method of claim 1 wherein the request comprises identity data identifying a communication group to which the first and second communication nodes belong.

3. The method of claim 1 wherein the request comprises identity data identifying the first communication node.

4. The method of claim 1 further comprising:
   encrypting, at the remote management system, the group encryption key with a key uniquely associated with the first communication node prior to transferring the group encryption key to the first communication node; and
   encrypting, at the remote management system, the group encryption key with a key uniquely associated with the second communication node prior to transferring the group encryption key to the second communication node.

5. The method of claim 3 wherein the identity data comprises a first communication node device key.

6. The method of claim 5 wherein the first communication node device key is an ephemeral device key negotiated by the remote management system and the first communication node.

7. A system comprising:
   a remote management computer configured for managing a group of communication nodes, including establishing secure communication between communication nodes, the remote management computer comprising:
one or more processors;
a computer readable storage medium having instructions stored thereon that cause the one or more processors to:
receive, via a control channel including a first network link used by the remote management system to manage communication nodes, a request from a first communication node to enable secure communications between the first communication node and a second communication node across a transport channel, the transport channel including a second network link separate from the control channel;
generate a group encryption key in response to the received request;
encrypt the group encryption key prior to transferring the group encryption key to the first and second communication nodes through one or more control channels; and
transfer the group encryption key to the first and second communication nodes through the control channel.

8. The system of claim 7 wherein the request comprises identity data identifying a communication group to which the first and second communication nodes belong.

9. The system of claim 7 wherein the request comprises identity data identifying the first communication node.

10. The system of claim 7 wherein the instructions further cause the management computer to:
encrypt the group encryption key with a first key uniquely associated with the first communication node prior to transferring the group encryption key to the first communication node; and
encrypt the group encryption key with a second key uniquely associated with the second communication node prior to transferring the group encryption key to the second communication node.

11. The system of claim 7 wherein the group encryption key is a symmetric key.

12. The system of claim 9 wherein the identity data comprises a first communication node device key.

13. The system of claim 12 wherein the first communication node device key is an ephemeral device key negotiated by the remote management computer and the first communication node.

14. A method comprising:
operating a first communication node in a group of communication nodes managed by a remote management system, including:
transmitting a request to the remote management system through a control channel, including a first network link used by the remote management system to manage communication nodes, to enable secure communications between the first communication node and a second communication node in the group of communication nodes;
receiving a group encryption key from the remote management system based on the received request, wherein the group encryption key has been encrypted prior to receipt via one or more control channels;
encrypting user data using the group encryption key; and
transmitting the encrypted user data through a data transport network to the second communication node, the transport channel including a second network link separate from the control channel.

15. The method of claim 14 wherein the request comprises at least one of the following:
identity data identifying the group of communication nodes to which the first and second communication nodes belong;
identity data identifying the first communication node; and
identity data comprising a first communication node device key.

16. The method of claim 14 further comprising decrypting, at the first communication node, the group encryption key received from the remote management system using a private key of the first communication node.

17. The method of claim 14 wherein the group encryption key is a symmetric key.

18. The method of claim 14 wherein the first and second communication nodes exchange the secure communications to the exclusion of eavesdropping by the remote management system.

19. The method of claim 15 wherein the first communication node device key is an ephemeral device key negotiated by the remote management system and the first communication node.

* * * * *